Aug. 23, 1932.  D. G. ADAMS  1,873,914
HIGH PRESSURE COUPLER
Filed Dec. 31, 1928
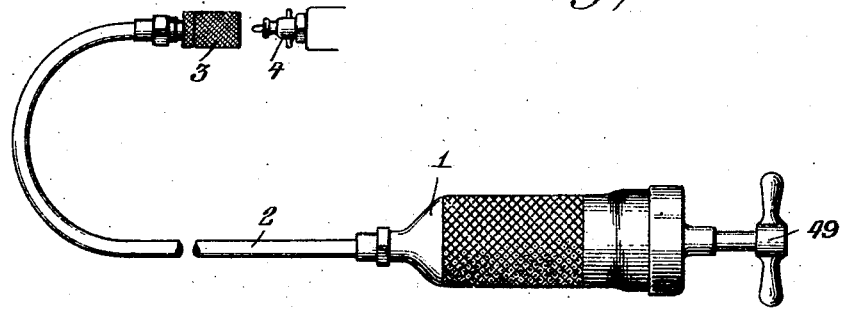
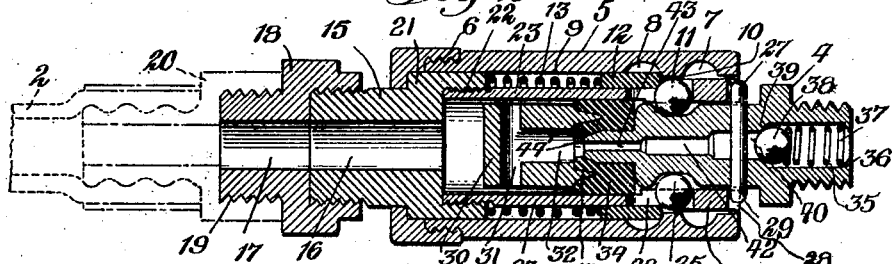
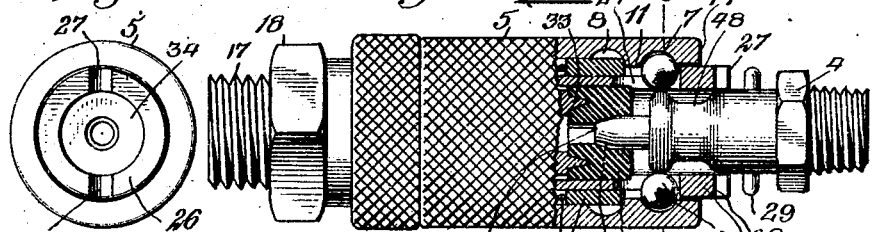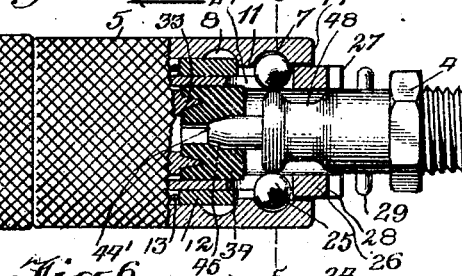
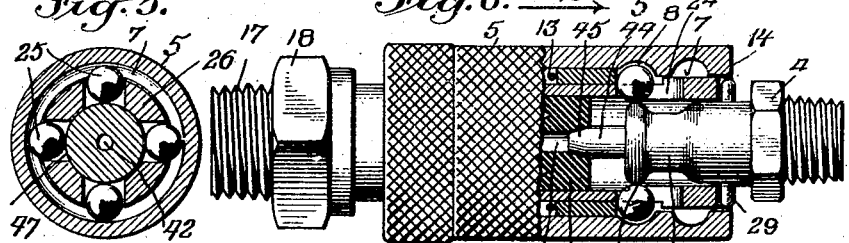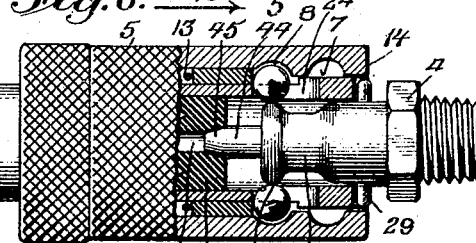
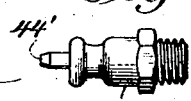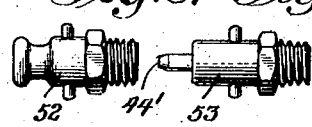
WITNESSES
INVENTOR
Daniel G. Adams
ATTORNEYS Patented Aug. 23, 1932

1,873,914

UNITED STATES PATENT OFFICE

DANIEL G. ADAMS, OF NEW YORK, N. Y., ASSIGNOR TO ADAMS GREASE GUN CORPORATION, OF NEW YORK, N. Y., A CORPORATION OF NEW YORK

HIGH PRESSURE COUPLER

Application filed December 31, 1928. Serial No. 329,361.

This invention relates to an improved high pressure coupler for high pressure grease systems to be used in machinery of different kinds, and particularly to be used with automobiles, the structure coacting with any kind of pump, gun or other high pressure device for forcing the grease through the coupler directly or through a pipe line or tubular conduit to a desired point without leakage and with a minimum effort in connecting and disconnecting the various parts.

An object of the invention is to provide a high pressure coupler which may be applied directly to a pump, grease gun or the like or connected to a conduit, which in turn is connected to the grease gun, pump or the like, the coupler being such that it may be forced onto a fitting by movement toward the fitting or removed from the fitting by a reverse movement of the coupler.

Another object of the invention is to produce a high pressure coupler, wherein the parts are so formed that by a movement toward the fitting or male coupler the device will be moved to a coupling position and by a reverse movement the coupler may be disconnected, though the parts are so formed that when grease is flowing therethrough there will be no leakage nor will the grease be able to force the coupler from its coupling position.

A still further object, more specifically, is to provide a high pressure coupler wherein balls are used to lock the parts in a coupling position, the fitting or male member being formed so as to receive and properly coact with a plurality of different kinds of coupling members.

In the accompanying drawing,—

Figure 1 is a side view of the grease gun having a flexible hose or conduit extending therefrom and a coupler disclosing an embodiment of the invention;

Figure 2 is a longitudinal vertical sectional view through the coupler shown in Figure 1, the same being shown in a fully coupled position ready for the grease or other matter to be forced therethrough;

Figure 3 is a view similar to Figure 2 but showing certain parts in elevation and the remaining parts with the coupler only moved to a partial coupling position;

Figure 4 is an end view of the coupler shown in Figure 3;

Figure 5 is a sectional view through Figure 3 on the line 5—5;

Figure 6 is a view similar to Figure 3 showing the coupler formed over the fitting to an extreme position ready for the movement of the float to the full coupling position;

Figure 7 is a side view of a modified form of fitting to that shown in Figure 2;

Figure 8 is a further modified form of fitting to that shown in Figure 2;

Figure 9 is an additional or third modified form of fitting to that shown in Figure 2.

Referring to the accompanying drawing by numerals, 1 indicates a grease gun of any desired kind, 2 a flexible conduit of any desired kind, and 3 the coupler. Coacting with the coupler 3 is a fitting or male coupling member 4, said fitting being adapted to be connected to part of an automobile or to some other machinery or article to be lubricated. Instead of using a gun, as shown in Figure 1, a pump or other device for forcing grease under pressure could be used, as the particular construction of gun, pump or the like and the particular construction of the conduit 2 form no part of the present invention except in combination. Also, if preferred, the conduit 2 could be omitted and the coupler 3 secured directly to gun 1. The coupler 3 is shown in a longitudinal vertical section in Figure 2, wherein it will be seen that the coupler is made up of a number of parts which coact with the fitting 4 and which, as hereinafter fully described, may coact with other kinds of fittings. In constructing the coupler 3 a tubular casing 5 is provided having an externally-threaded portion 6 and a pair of internal annular grooves 7 and 8. The bore of the casing 5 along the line 9 is greater than along the line 10, whereby the annular portion 11 acts as an abutment for the spring-pressed collar 12. From Figure 2 it will be noted that the spring 13 tends to force the collar 12 toward the front 14 of the coupler, said spring acting against the tubular base 15. The base 15 is provided with a central bore 16 registering with bore 17 of the nipple 18, which nipple is screwed onto the base 15 and provided with a threaded portion 19 for receiving the member 20 which is screwed thereon and which has a part forced into the tube of conduit 2. Preferably all the threaded parts are slightly tapering so that when properly screwed up a grease-tight connection is provided. Base 15 is provided with an enlargement 21 having a threaded portion 22 into which is screwed the threaded end of the sleeve 23. Sleeve 23 is provided with an elongated opening 24 for each of the balls 25. Also, the sleeve 23 is provided with an enlarged end portion 26 adapted to slidably fit within the annular portion 27. It will also be noted that the large end 26 is provided with grooves or notches 27 and 28 adapted to receive the end portions of pin 29 when the parts are in the position shown in Figure 2. These notches are adapted to receive pins on other forms of fittings than that shown in Figure 2. Arranged interiorly of the sleeve 23 is a float 30, said float having a transverse passageway 31 merging into a longitudinal passageway 32. This float is of slightly less diameter than the interior of sleeve 23 and is provided at its forward end with an annular washer engaging member 33. This member is substantially triangular in cross-section with a sharp edge adapted to receive the washer 34. Washer 34 may be made of any desired material, as for instance, leather, and is forced over member 33 until the parts are substantially in the position shown in Figure 2. This washer is of appreciable thickness and is capable of coacting with different kinds of fittings to produce a grease-tight connection when grease enters the sleeve 23 on its way out through the fitting 4. It will be noted that the washer 34 tightly fits the sleeve 23 and also tightly fits against the fitting 4. The knife edge of the member 33 causes part of the washer to move radially outwardly and another part to move radially inwardly, whereby an exceptionally tight connection is made so that there will be no leakage around the washer from any part. Coacting with the coupler 3 is a fitting 4, as shown in Figures 1 to 6 inclusive. This fitting is provided with a comparatively large bore 35 having a turned-in annular portion 36 against which one end of the spring 37 presses. The spring 37 also acts on the ball 38 to give the same a tendency to remain always against its seat at 39. A second bore 40 merges into bore 35 which in turn merges into bore 42. A comparatively small bore 43 extends from bore 42 to the end of the tubular projection or nipple 44. This projection or nipple is provided with a chamfered end 45, whereby the bore 46 of washer 34 may be entered by member 44 and the parts gradually forced to the position shown in Figure 2 when a full supply of grease is passing through the device. The fitting 4 is provided with an annular bead 47 and adjacent this bead is a comparatively wide annular groove 48 adapted to receive the balls 25 when the parts are in their fully coupled or locked position, as shown in Figure 2. It will be noted that the washer abuts squarely against the face of the bead 47 when the parts are in use. When the coupler 3 is in the position shown in Figure 1 and it is desired to interlock the same with fitting 4, the coupler 3 is merely moved over the fitting to the desired point and the parts will automatically interlock so that a pull on the conduit 2 cannot separate the various parts. When it is desired to remove the coupler 3 the casing 5 is grasped and the coupler pulled away from fitting 4. It will thus be seen that the coupler 3 is applied by a movement in one direction and removed by a movement in the opposite direction, so that only one hand is necessary to apply or remove the coupler 3. In applying the coupler 3, it is forced over the fitting 4 until the parts assume, for instance, the position shown in Figure 6. As soon as it takes this position the spring 13 forces the collar 12 forwardly so that the balls 25 will move down into the groove 48 beneath the section 11, so that the balls 25 and the fitting 4 are in the position shown in Figure 2. As soon as the pressure of the incoming grease engages float 30 the pressure of the grease will move the float 30 until the washer 34 and associated parts have assumed the position shown in Figure 2. The parts remain in this position as long as the grease is flowing. When it is desired to remove the coupler 3 casing 5 is grasped and pulled away from the fitting 4. When this occurs the casing 5 moves so that the balls 25 will be opposite groove 7 and then the casing 5, sleeve 23 and associated parts will move in unison, whereupon the bead 47 will pass beneath balls 25 and thence out of the coupler 3, or rather, the parts of the coupler 3 will move away from the fitting 4. When the parts are in operative position with the pin 29 fitting in the notches 27 and 28, the coupler 3, gun 1 and associated parts cannot be rotated, but the handle 49 may be rotated for causing the gun 1 to function. This is of particular advantage where a workman must reach beneath the automobile or other piece of machinery and operate the device with one hand.

The fitting 4, as shown in Figures 1 to 6 inclusive, is a preferred embodiment of fitting, as it answers the purpose in a very efficient manner and cooperates with coupler 3 fully. Notwithstanding this fact, this fitting may fit a number of other couplers now on the market, by reason of the fact that the member 44 will coact with certain kinds of couplers, the portion embodying the bead 47 other kinds of couplers, and the complete structure will coact properly with the specific coupler shown in the accompanying drawing. In addition, the coupler 3 will coact with modified forms of fittings shown in Figures 7, 8, and 9. These fittings will not only cooperate with coupler 3, but also with a number of other well-known couplers now on the market. This is of particular advantage in that different automobiles may be provided with different kinds of fittings and yet the fittings shown in Figures 1 to 9 will cooperate with most of the couplers now on the market, and in addition, coupler 3 will cooperate with most of the fittings now on the market, as well as the fittings shown in the accompanying drawing. In Figure 7 a fitting 51 is shown which is identical with that shown in Figure 2, except that the pin 29 has been eliminated. In Figure 8 a fitting 52 is shown which is identical with that shown in Figure 2, except that the nipple or member 44 has been eliminated. Figure 9 shows a fitting 53 which is identical with that shown in Figure 2, except that the groove 48 has been omitted. In forming the projection or seat member 44 the same is provided with a circumferential dirt-cutting edge 44'. This permits the projection to function properly when used with the washer 34 and also to function when used with a metal contact member or under varying circumstances. This edge being comparatively sharp, acts as a cleaning member so that the parts will properly fit to produce a grease-tight connection when in operating position.

What I claim is:—

1. In a high pressure coupler, a coupler body provided with a sleeve, a tubular base connected with said sleeve and provided with a shoulder, a sliding casing mounted on said sleeve and provided with means adapted to interlock with said shoulder for limiting the sliding movement of the casing in one direction, said casing having a pair of spaced annular grooves adjacent one end, a plurality of balls acting as locks, resiliently actuated means for moving said balls in one direction and a coupling fitting for moving the balls in the opposite direction, said balls when fitting in said grooves permitting the coupling fitting to move in and out and when forced to a position between the grooves acting as locking means for preventing the fitting from being removed from the coupler.

2. In a high pressure coupler, a fitting provided with a groove and a coupler body coacting therewith, said body including a tubular base, a sleeve threaded on the base, said sleeve having a plurality of slots, a collar surrounding said sleeve, a ball arranged in each slot, a spring acting on said collar to tend to force said balls toward the end of the coupler, and a sliding casing fitted over said collar and said base, said casing surrounding said spring and sleeve, said casing having a pair of spaced annular grooves at the end opposite said base, the material between said grooves projecting inwardly a short distance, whereby whenever said balls are resting in the grooves in said fitting and beneath said projection the parts will be locked together but may be separated by pulling the casing in a direction away from the fitting.

DANIEL G. ADAMS.